(12) United States Patent
Joshi et al.

(10) Patent No.: US 10,859,187 B2
(45) Date of Patent: Dec. 8, 2020

(54) HANGER ASSEMBLY FOR MOUNTING MULTIPLE CABLES

(71) Applicant: CommScope Technologies LLC, Hickory, NC (US)

(72) Inventors: Aviral Joshi, Chicago, IL (US); Ronald A. Vaccaro, Taylorsville, NC (US); Taig S. Rajpal, Chicago, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/854,159

(22) Filed: Apr. 21, 2020

(65) Prior Publication Data

US 2020/0256483 A1 Aug. 13, 2020

Related U.S. Application Data

(63) Continuation of application No. 15/856,201, filed on Dec. 28, 2017, now Pat. No. 10,634,265.

(60) Provisional application No. 62/447,929, filed on Jan. 19, 2017.

(51) Int. Cl.
*F16L 3/22* (2006.01)
*F16L 3/133* (2006.01)
*F16L 3/13* (2006.01)
*H02G 3/32* (2006.01)

(52) U.S. Cl.
CPC .................. *F16L 3/221* (2013.01); *F16L 3/13* (2013.01); *F16L 3/133* (2013.01); *F16L 3/222* (2013.01); *H02G 3/32* (2013.01)

(58) Field of Classification Search
CPC .................................. F16L 3/221; F16L 3/227
See application file for complete search history.

(56) References Cited

U.S. PATENT DOCUMENTS

| | | |
|---|---|---|
| 1,376,284 A | 4/1921 | Kohn |
| 1,452,497 A | 4/1923 | Fischer |
| 2,032,413 A | 3/1936 | Hall |
| 2,166,916 A | 7/1939 | Lombard |
| 2,179,406 A | 11/1939 | Fitzpatrick |
| 2,375,513 A | 8/1945 | Bach |
| 2,447,025 A | 8/1948 | Newman |
| 2,453,980 A | 11/1948 | Hartmann |
| 2,470,814 A | 5/1949 | Hain |
| 2,495,848 A | 1/1950 | Kiesel |
| 2,560,845 A | 7/1951 | Carpenter et al. |
| 2,605,865 A | 8/1952 | Liptay |

(Continued)

FOREIGN PATENT DOCUMENTS

| | | |
|---|---|---|
| BR | 102014007903 | 12/2015 |
| CN | 1520498 | 8/2004 |

(Continued)

OTHER PUBLICATIONS

International Preliminary Report on Patentability corresponding to International Application No. PCT/US2017/056019 dated May 23, 2019.

(Continued)

*Primary Examiner* — Bradley Duckworth
(74) *Attorney, Agent, or Firm* — Myers Bigel, P.A.

(57) ABSTRACT

A cable hanger assembly includes: a mounting substrate, the mounting substrate including a plurality of holes configured to receive clips; and a plurality of clips, each of the clips configured to receive a cable and mount in one of the plurality of holes of the mounting substrate.

17 Claims, 5 Drawing Sheets

(56) References Cited

U.S. PATENT DOCUMENTS

| | | | |
|---|---|---|---|
| 2,723,431 A | 11/1955 | Di Renzo |
| 2,746,110 A | 5/1956 | Bedford, Jr. |
| 2,990,150 A | 6/1961 | Weigel et al. |
| 3,042,352 A | 7/1962 | Stamper |
| 3,050,578 A | 8/1962 | Huebner |
| 3,163,712 A | 12/1964 | Cochran |
| 3,179,969 A | 4/1965 | Glynn |
| 3,404,858 A | 10/1968 | Levy |
| 3,430,904 A | 3/1969 | Soltysik |
| 3,485,467 A | 12/1969 | Fuchs et al. |
| 3,501,117 A | 3/1970 | Soltysik |
| 3,536,281 A | 10/1970 | Meehan et al. |
| 3,599,915 A | 8/1971 | Soltysik |
| 3,916,089 A | 10/1975 | Sloan |
| 3,981,048 A | 9/1976 | Moody et al. |
| 4,148,113 A | 4/1979 | Dvorachek |
| 4,244,542 A | 1/1981 | Mathews |
| 4,295,618 A | 10/1981 | Morota et al. |
| 4,306,697 A | 12/1981 | Mathews |
| 4,344,480 A | 8/1982 | Boyer et al. |
| 4,356,987 A | 11/1982 | Schmid |
| 4,669,156 A | 6/1987 | Guido et al. |
| 4,795,856 A | 1/1989 | Farmer |
| 4,813,639 A | 3/1989 | Midkiff et al. |
| D305,099 S | 12/1989 | Naruse |
| 5,035,383 A | 7/1991 | Rainville |
| 5,085,384 A | 2/1992 | Kasubke |
| 5,149,027 A | 9/1992 | Weber |
| 5,188,318 A | 2/1993 | Newcomer et al. |
| 5,320,312 A | 6/1994 | Hoenninger |
| 5,393,021 A | 2/1995 | Nelson |
| D357,802 S | 5/1995 | Todd et al. |
| 5,587,555 A | 12/1996 | Rinderer |
| 5,677,513 A | 10/1997 | Ito et al. |
| 5,833,188 A | 11/1998 | Studdiford et al. |
| 5,876,000 A | 3/1999 | Ismert |
| 5,921,520 A | 7/1999 | Wisniewski |
| 5,971,329 A | 10/1999 | Hickey |
| 6,317,933 B1 | 11/2001 | Suenaga |
| 6,323,430 B1 | 11/2001 | Finona |
| 6,354,543 B1 | 3/2002 | Paske |
| 6,580,867 B2 | 6/2003 | Galaj et al. |
| 6,899,305 B2 | 5/2005 | Korczak et al. |
| 7,131,792 B2 | 11/2006 | Doverspike |
| 7,384,018 B2 | 6/2008 | Moretto |
| 7,500,644 B2 | 3/2009 | Naudet et al. |
| 7,518,058 B1 | 4/2009 | Hagbrandt et al. |
| D597,403 S | 8/2009 | Ho et al. |
| 7,651,056 B2 | 1/2010 | Tjerrild |
| 7,997,546 B1 | 8/2011 | Andersen et al. |
| 8,020,259 B2 | 9/2011 | Ho et al. |
| 8,020,811 B2 | 9/2011 | Nelson |
| 8,191,836 B2 | 6/2012 | Korczak |
| 8,439,316 B2 | 5/2013 | Feige |
| 8,541,682 B2 | 9/2013 | Mazelle et al. |
| 8,776,328 B2 | 7/2014 | Kodi |
| 8,785,779 B1 | 7/2014 | Jones et al. |
| 8,879,881 B2 | 11/2014 | Cote et al. |
| 9,127,789 B2 | 9/2015 | Caspari et al. |
| 9,206,927 B2 | 12/2015 | Carter et al. |
| 9,759,880 B2 | 9/2017 | Chamberlain et al. |
| 9,841,123 B1 | 12/2017 | White |
| 9,853,434 B2 | 12/2017 | Vaccaro |
| 9,866,004 B2 | 1/2018 | Vaccaro et al. |
| 9,879,803 B2 | 1/2018 | Leng |
| 9,903,510 B2 | 2/2018 | Joshi et al. |
| 9,995,414 B2 | 6/2018 | Joshi et al. |
| 10,215,308 B2 | 2/2019 | Bartos |
| 10,415,723 B2 | 9/2019 | Vaccaro et al. |
| 2002/0005463 A1 | 1/2002 | Korczak et al. |
| 2002/0012582 A1 | 1/2002 | Kirkegaard et al. |
| 2003/0173470 A1 | 9/2003 | Geiger |
| 2004/0113027 A1 | 6/2004 | Nakanishi |
| 2004/0251386 A1 | 12/2004 | Mizukoshi et al. |
| 2005/0109887 A1 | 5/2005 | Catapano |
| 2005/0109890 A1 | 5/2005 | Korczak et al. |
| 2005/0253025 A1 | 11/2005 | Benoit et al. |
| 2006/0108480 A1 | 5/2006 | Goodwin et al. |
| 2006/0237217 A1 | 10/2006 | Glew |
| 2006/0249633 A1 | 11/2006 | Korczak et al. |
| 2007/0007397 A1 | 1/2007 | Nelson |
| 2007/0120023 A1 | 5/2007 | Martinez et al. |
| 2007/0246616 A1 | 10/2007 | Budagher |
| 2008/0093510 A1 | 4/2008 | Oh et al. |
| 2008/0115448 A1 | 5/2008 | Kodi |
| 2009/0230256 A1 | 9/2009 | Widlacki et al. |
| 2009/0242715 A1 | 10/2009 | Kosidlo et al. |
| 2009/0294602 A1 | 12/2009 | Korczak |
| 2010/0084520 A1 | 4/2010 | Ohno |
| 2011/0107719 A1 | 5/2011 | Kodi |
| 2011/0226913 A1 | 9/2011 | Feige |
| 2011/0260025 A1 | 10/2011 | Aoshima et al. |
| 2011/0283515 A1 | 11/2011 | Korczak |
| 2012/0045608 A1 | 2/2012 | Huchet et al. |
| 2012/0085577 A1 | 4/2012 | Eshima et al. |
| 2012/0305724 A1 | 12/2012 | Diez Herrera et al. |
| 2013/0104494 A1 | 5/2013 | Evangelista et al. |
| 2013/0146720 A1 | 6/2013 | Meyers et al. |
| 2013/0146721 A1 | 6/2013 | White |
| 2013/0175407 A1 | 7/2013 | Williams et al. |
| 2013/0187012 A1 | 7/2013 | Blakeley et al. |
| 2013/0320157 A1 | 12/2013 | Carter et al. |
| 2013/0320182 A1 | 12/2013 | Kataoka et al. |
| 2014/0054425 A1 | 2/2014 | Jang |
| 2014/0259620 A1 | 9/2014 | Hicks et al. |
| 2014/0260083 A1 | 9/2014 | Zhang et al. |
| 2015/0136473 A1 | 5/2015 | Jafari et al. |
| 2015/0155669 A1 | 6/2015 | Chamberlain et al. |
| 2015/0159781 A1 | 6/2015 | Wilson et al. |
| 2016/0281881 A1 | 9/2016 | Vaccaro et al. |
| 2016/0281883 A1 | 9/2016 | Vaccaro |
| 2016/0327187 A1 | 11/2016 | Brown |
| 2016/0341340 A1 | 11/2016 | Gomes Fernandes |
| 2018/0045336 A1 | 2/2018 | Vaccaro |
| 2018/0172183 A1 | 6/2018 | Joshi et al. |
| 2018/0202580 A1 | 7/2018 | Joshi et al. |
| 2020/0041039 A1 | 2/2020 | Varale |

FOREIGN PATENT DOCUMENTS

| | | |
|---|---|---|
| CN | 101589513 | 11/2009 |
| DE | 845808 | 8/1952 |
| DE | 2401187 | 1/1975 |
| DE | 2903306 | 8/1979 |
| DE | 3823578 | 2/1989 |
| DE | 102017106520 | 9/2018 |
| EP | 3539191 A2 | 9/2019 |
| FR | 2145985 | 2/1973 |
| FR | 2176184 | 10/1973 |
| GB | 1599416 | 9/1981 |
| JP | 5775283 | 5/1982 |
| JP | 61200974 | 12/1986 |
| JP | 886386 | 4/1996 |
| JP | 9144719 | 6/1997 |
| JP | 10019168 | 1/1998 |
| JP | 11223281 | 8/1999 |
| JP | 2002130539 | 5/2002 |
| JP | 3653346 | 5/2005 |
| JP | 2012002323 | 1/2012 |
| JP | 2012222986 | 11/2012 |
| KR | 101399938 | 6/2014 |
| WO | 2002095956 | 11/2002 |
| WO | 2008082595 | 7/2008 |
| WO | 2010/143222 | 12/2010 |

OTHER PUBLICATIONS

International Preliminary Report on Patentability corresponding to International Application No. PCT/US2017/060115 dated May 23, 2019.

International Preliminary Report on Patentability corresponding to International Application No. PCT/US2017/062730 dated Jun. 13, 2019.

(56) References Cited

OTHER PUBLICATIONS

International Preliminary Report on Patentability corresponding to International Application No. PCT/US2017/062743 dated Jun. 27, 2019.
International Preliminary Report on Patentability corresponding to International Application No. PCT/US2017/068510 dated Aug. 1, 2019.
Notification of Transmittal of the International Search Report and the Written Opinion of the International Searching Authority, or the Declaration corresponding to International Application No. PCT/US2017/056019 dated Jan. 24, 2018.
Notification of Transmittal of the International Search Report and the Written Opinion of the International Searching Authority, or the Declaration corresponding to International Application No. PCT/US2017/060115 dated Feb. 14, 2018.
Notification of Transmittal of the International Search Report and the Written Opinion of the International Searching Authority, or the Declaration corresponding to International Application No. PCT/US2017/062730 dated Mar. 13, 2018.
Notification of Transmittal of the International Search Report and the Written Opinion of the International Searching Authority, or the Declaration corresponding to International Application No. PCT/US2017/062743 dated Mar. 12, 2018.
Notification of Transmittal of the International Search Report and the Written Opinion of the International Searching Authority, or the Declaration corresponding to International Application No. PCT/US2017/065801 dated Apr. 13, 2018.
Notification of Transmittal of the International Search Report and the Written Opinion of the International Searching Authority, or the Declaration corresponding to International Application No. PCT/US2017/068510 dated Apr. 17, 2018.
Office Action corresponding to Chinese Application No. 201780065736.9 dated Mar. 2, 2020.
Office Action corresponding to Chinese Application No. 201780067453.8 dated Jan. 22, 2020.
Office Action corresponding to Chinese Application No. 201780075198.5 dated Jan. 21, 2020.
PCT Notification of Transmittal of the International Search Report and the Written Opinion of the International Searching Authority, or the Declaration, corresponding to PCT International Application No. PCT/US2019/042952, dated Nov. 8, 2019, 11 pages.
European Search Report corresponding to European Application No. 17870023.3 dated Jun. 3, 2020.
Extended European Search Report corresponding to European Application No. 17870144.7 dated Jun. 3, 2020.
Extended European Search Report corresponding to European Application No. 17875334.9 dated Jun. 2, 2020.
Office Action corresponding to Chinese Application No. 201780067503.2 dated Feb. 3, 2020.
Office Action corresponding to Chinese Application No. 201780075195.8 dated Jan. 21, 2020.
"Extended European Search Report corresponding to European Patent Application No. 17892843.8 dated Oct. 1, 2020, 8 pages".

HANGER ASSEMBLY FOR MOUNTING MULTIPLE CABLES

RELATED APPLICATION

The present application is a continuation of and claims priority to U.S. patent application Ser. No. 15/856,201, filed Dec. 28, 2017, now U.S. Pat. No. 10,634,265, which claims priority from and the benefit of U.S. Provisional Patent Application No. 62/447,929, filed Jan. 19, 2017, the disclosure of which is hereby incorporated herein in its entirety.

FIELD OF THE INVENTION

The present invention relates generally to devices for supporting cables and, in particular, to hangers for securing cables to support structures.

BACKGROUND OF THE INVENTION

Cable hangers are commonly used to secure cables to structural members of antenna towers and or along tunnel walls. Generally, each cable is attached to a structural member by cable hangers mounted at periodically-spaced attachment points.

Antenna towers and/or tunnels may be crowded due to the large numbers of cables required for signal-carrying. Over time, as systems are added, upgraded and/or expanded, installation of additional cables may be required. To conserve space, it may be desirable for each set of cable hangers to secure more than a single cable. Certain cable hangers have been constructed to secure multiple cables; other cable hangers have a stackable construction that permits multiple cable hangers to be interlocked extending outwardly from each mounting point/structural member. Stacked and multiple-cable-type cable hangers significantly increase the number of cables mountable to a single attachment point.

One popular stackable cable hanger is discussed in U.S. Pat. No. 8,191,836 to Korczak, the disclosure of which is hereby incorporated herein by reference in its entirety. One such cable hanger, designated broadly at 10, is shown in FIGS. 1 and 2. The hanger 10 includes curved arms 5 that extend from a flat base 6. Locking projections 7 extend from the free ends of the arms 5. As can be seen in FIGS. 1 and 2, the locking projections 7 are inserted into a reinforced hole 8 in a tower structure 4 to mount the hanger 10 thereon. The base 6 of the hanger 10 includes a reinforced hole 9 that can receive the projections of another hanger 10 to mount a second cable.

As can be best seen in FIG. 2, the arms 5 include arcuate sections 14 that together generally define a circle within which a cable can reside. Two cantilevered tabs 12 extend radially inwardly and toward the base 6 at one end of the arcuate sections 14, and two cantilevered tabs 16 extend radially inwardly and toward the base 6 from the opposite ends of the arcuate sections 14. The cantilevered tabs 12, 16 are deployed to deflect radially outwardly when the hanger 10 receives a cable for mounting; this deflection generates a radially inward force from each tab 12, 16 that grips the jacket of the cable.

Hangers can be "stacked" onto each other by inserting the locking projections 7 of one hanger into the large hole 9 of the next hanger. One variety of cable hanger of this type is the SNAP-STAK® hanger, available from CommScope, Inc. (Joliet, Ill.).

The SNAP-STAK® hanger is offered in multiple sizes that correspond to the outer diameters of different cables. This arrangement has been suitable for use with RF coaxial cables, which tend to be manufactured in only a few different outer diameters; however, the arrangement has been less desirable for fiber optic cables, which tend to be manufactured in a much greater variety of diameters. Moreover, fiber optic cables tend to be much heavier than coaxial cables (sometimes as much as three times heavier per unit foot), which induces greater load and stress on the hangers.

Multiple approaches to addressing this issue are offered in co-assigned and co-pending U.S. Patent Publication No. 2016/0281881 to Vaccaro, the disclosure of which is hereby incorporated herein by reference in full. One cable hanger discussed in this publication is shown in FIGS. 3 and 4 and designated broadly at 610 therein. The cable hanger 610 is somewhat similar to the cable hanger 10, inasmuch as it has a base 606, curved arms 605 and locking projections 607 that resemble those of the hanger 10 discussed above. However, the cable hanger 610 also has flex members 618 that define chords across the arcuate sections 614 of the arms 605. As can be seen in FIG. 4, cantilevered gripping members 612, 616 extend from the flex members 618 and into the cable-gripping space S within the arms 605. It can also be seen in FIG. 3 that the flex members 618 are tripartite, with two vertically offset horizontal runs 618a, 618c merging with the arcuate sections 614 of the arms 605 and a vertical run 618b extending between the horizontal runs 618a, 618c. The gripping members 612, 616 extend from opposite sides of the vertical run 618b and are vertically offset from each other.

In use, the cable hanger 610 is employed in the same manner as the cable hanger 10; a cable is inserted into the space S between the arms 605, which are then closed around the cable as the locking projections 607 are inserted into a mounting hole. The cantilevered gripping members 612, 616 can help to grip and to center the cable within the space S. The presence of the flex members 618, which are fixed end beams rather than cantilevered tabs, can provide additional gripping force beyond that of the cable hanger 10.

In view of the foregoing, it may be desirable to provide additional configurations of cable hangers to enable a technician to adapt to different cable sizes and mounting conditions.

SUMMARY

As a first aspect, embodiments of the invention are directed to a cable hanger assembly. The assembly comprises: a mounting substrate, the mounting substrate including a plurality of holes configured to receive clips; and a plurality of clips, each of the clips configured to receive a cable and mount in one of the plurality of holes of the mounting substrate.

In some embodiments, the cable hanger assembly is employed in combination with a plurality of cables mounted to the mounting substrate, wherein each of the cables is mounted with a respective one of the plurality of clips.

As a second aspect, embodiments of the invention are directed to a cable hanger assembly comprising: a mounting substrate, the mounting substrate having a main panel, wherein a plurality of holes configured to receive clips are located in the main panel; and a plurality of clips, each of the clips configured to receive a cable and mount in one of the plurality of holes of the mounting substrate.

As a third aspect, embodiments of the invention are directed to a cable hanger assembly comprising: a mounting substrate, the mounting substrate including a base, a pair of arms attached to the base, and locking features attached to free ends of the arms, wherein each of the arms includes a plurality of holes configured to receive clips; and a plurality of clips, each of the clips configured to receive a cable and mount in one of the plurality of holes of the mounting substrate.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular foul's "a", "an" and "the" are intended to include the plural forms as well, unless the context clearly indicates otherwise. It will also be understood that when an element (e.g., a device, circuit, etc.) is referred to as being "attached", "connected" or "coupled" to another element, it can be directly connected or coupled to the other element or intervening elements may be present. In contrast, when an element is referred to as being "directly attached", "directly connected" or "directly coupled" to another element, there are no intervening elements present.

Figure 1:
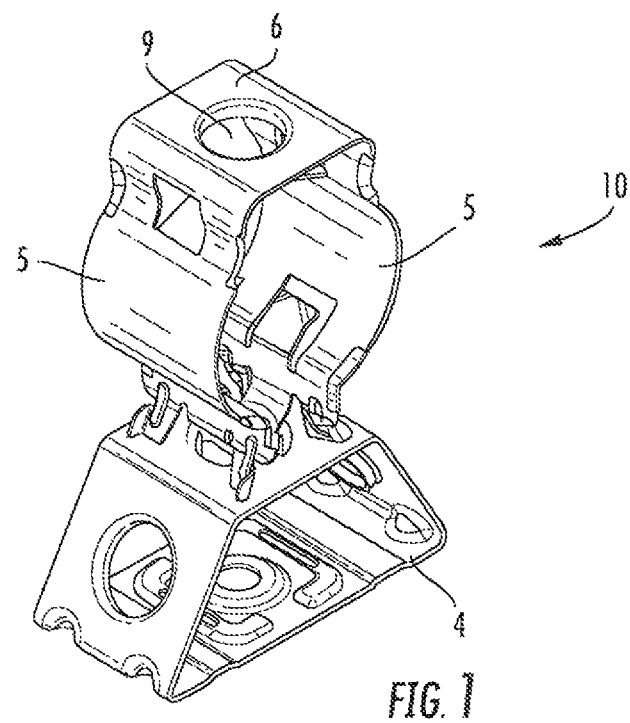
FIG. 1 is a perspective view of a prior art cable hanger.
Figure 2:
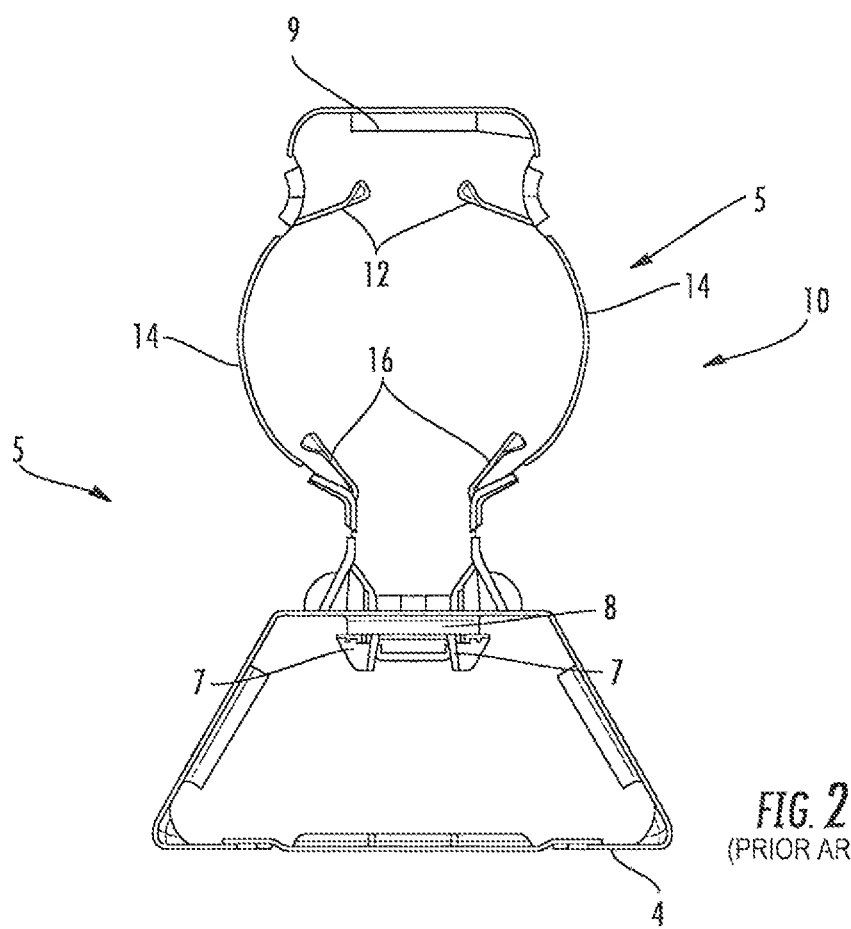
FIG. 2 is a top view of the prior art cable hanger of FIG. 1.
Figure 3:
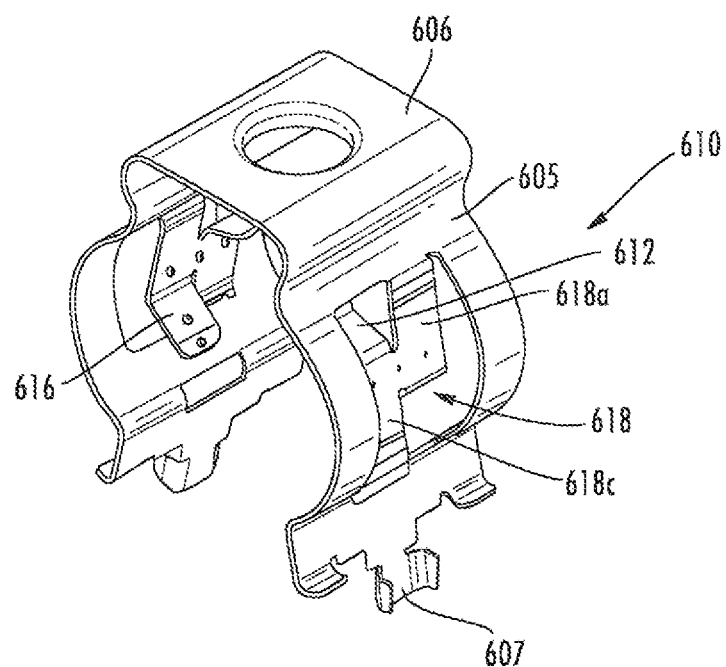
FIG. 3 is a perspective view of another prior art cable hanger.
Figure 4:
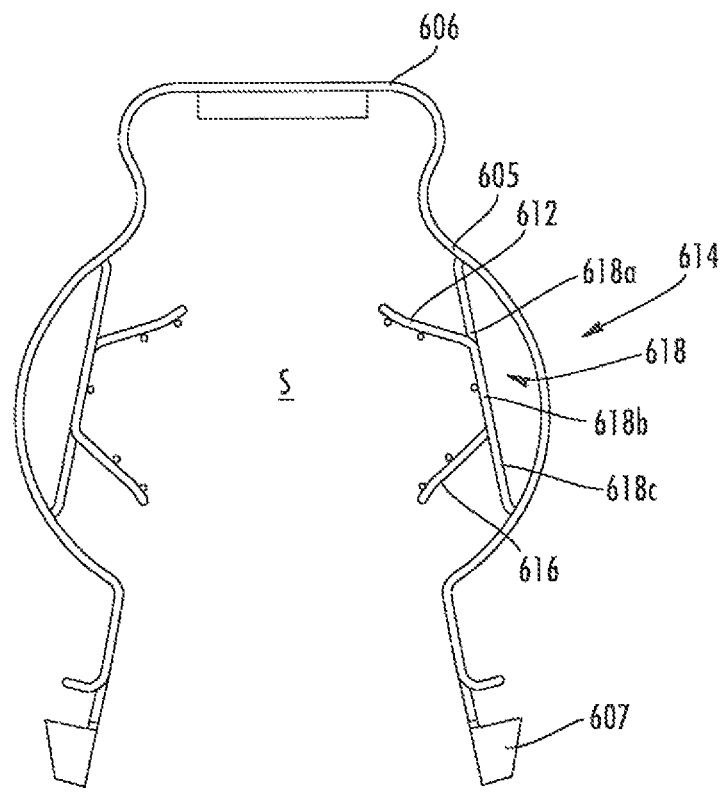
FIG. 4 is a top view of the cable hanger of FIG. 3.
Figure 5:
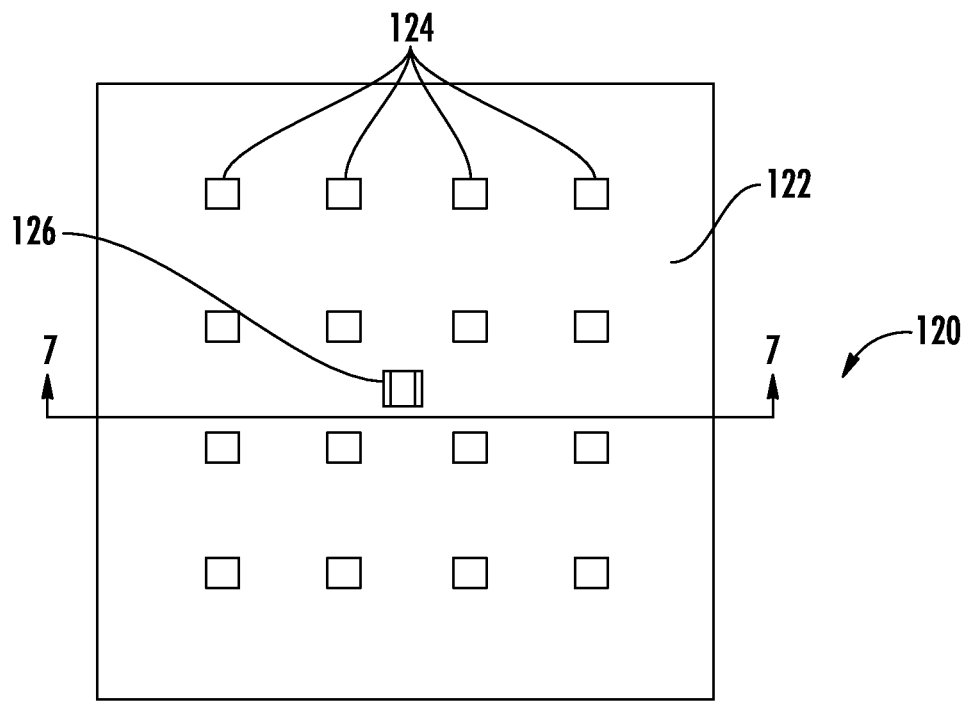
FIG. 5 is a front view of a mounting substrate of a cable hanger assembly according to embodiments of the invention.
Figures 6A, 6B:
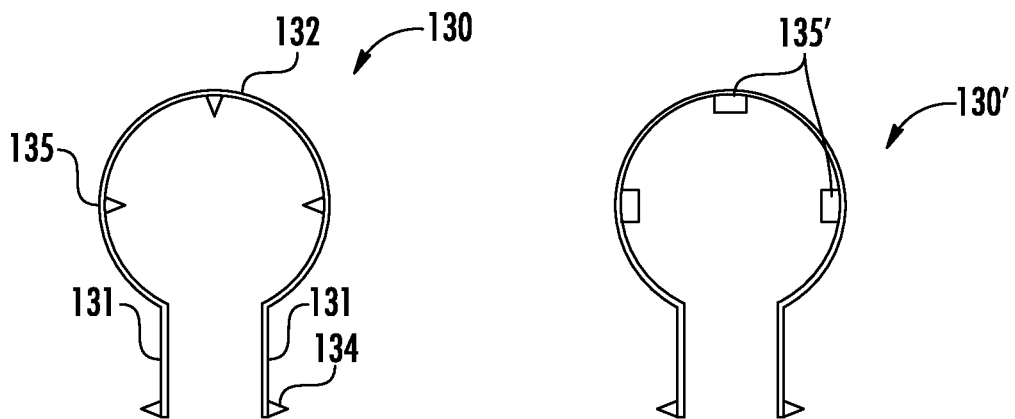
FIG. 6A is a top view of a clip to be used with the cable hanger assembly of FIG. 5.
FIG. 6B is a top view of an alternative clip to be used with the cable hanger assembly of FIG. 5.
Figure 7:
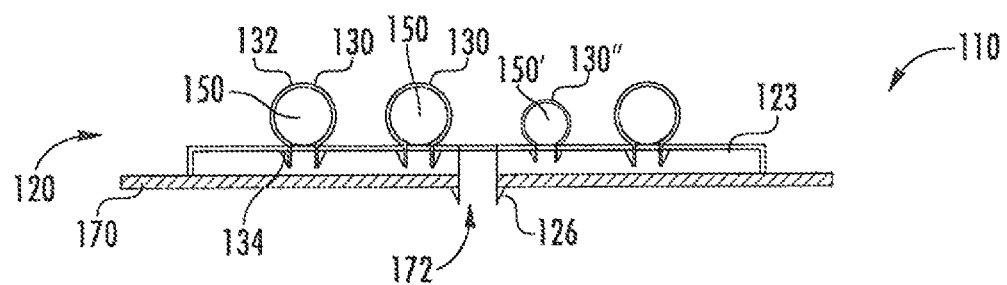
FIG. 7 is a top view of the mounting substrate of FIG. 5 mounted on a mounting structure with clips of FIG. 6A inserted therein to hold cables.

Referring now to the drawings, a cable hanger assembly 110 according to embodiments of the invention is shown in FIGS. 5-7. The assembly 110 includes a mounting substrate 120 and a plurality of clips 130. These are described in greater detail below.

The mounting substrate 120 includes a generally square, generally flat main panel 122 with four side edges 123. In the main panel 122, sixteen mounting holes 124 define a 4×4 grid, although other numbers, sizes and arrangements of holes 124 may also be suitable. Locking features 126 (which may take the form of the locking projections 107, 607 discussed above) are located in the central portion of the main panel 122. The locking features 126 are configured to be inserted into a mounting hole (typically nominally ¾ inch in diameter) of a mounting structure such as an antenna tower or the like.

Those skilled in this art will appreciate that the mounting substrate 120 discussed above is typically formed of a metallic material, such as steel, and may be formed as a monolithic member (often from a flat blank stamped from sheet steel and bent into a desired shape).

Referring now to FIG. 6A, a clip 130 is shown therein. The clip 130 is generally U-shaped, with two arms 131 that merge into a central base 132 (as shown in FIG. 6A, the base 132 may be somewhat wider than the distance between the arms 131). A locking feature, such as a hook 134, is located on the end of each arm 131. Gripping barbs 135 are located on the base 132 and extend radially inwardly. (Alternatively, gripping features other than barbs may be employed, such as the lances 135' on clip 130' shown in FIG. 6B, or ridges, edges, nubs, dimples and the like, that enhance gripping of a cable, facilitate insertion of a cable, or both. Examples of such features are described in co-assigned and co-pending U.S. patent application Ser. No. 15/335,614, filed Oct. 27, 2016, the disclosure of which is hereby incorporated herein in its entirety.)

Those skilled in this art will appreciate that the clips 130, 130' discussed above should be formed of a flexible, resilient material, such as a metallic material (e.g., steel) or a polymeric material, and may be formed as a monolithic member (often from a flat blank stamped from sheet steel and bent into a desired shape or via injection molding).

As can be seen in FIG. 7, in use the mounting substrate 120 is mounted to a mounting structure 170, such as an antenna tower, by inserting the locking features 126 into a mounting hole 172 in the mounting structure 170. The locking features 126 are deflected toward each other from a relaxed state, then inserted into the hole 172 (typically ¾ inch) in the mounting structure 170 in the deflected condition. The locking features 126 exert outward pressure on edges of the hole and maintain the cable hanger 110 in a mounted position on the mounting structure 170.

A cable 150 can then be mounted onto the mounting substrate 120 by capturing the cable 150 in the base portion 132 of the clip 130 and inserting the hooks 134 of the clip 130 into one of the holes 124 in the mounting substrate 120. The clips 130 extend away from the main panel 122 in a direction generally opposite that of the locking features 126. The presence of the hooks 134 secures the clip 130 in place, and the barbs 135 of the clip 130 assist in gripping the cable 150. The process can be repeated with additional cables 150 and additional clips 130 (FIG. 7 shows four cables 150 mounted on the mounting substrate 120).

Those skilled in this art will appreciate that other variations of the mounting substrate 120 may also be suitable. For example, the number, size and locations of the holes 124 may vary: the holes may be single or dual slots; more or fewer holes 124 may be included; the holes 124 may be larger or smaller, or may vary in size within the same mounting substrate 120; and the holes 124 may be located in different locations on the main panel 122 (for example, offset from each other) or even in the side edges 123. The side edges 123 may be formed differently, or some or all of the side edges 123 may be omitted entirely. The mounting substrate 120 not not be square, but could be rectangular, circular, oval, or a number of other shapes. Other variations are also contemplated.

Figure 8:
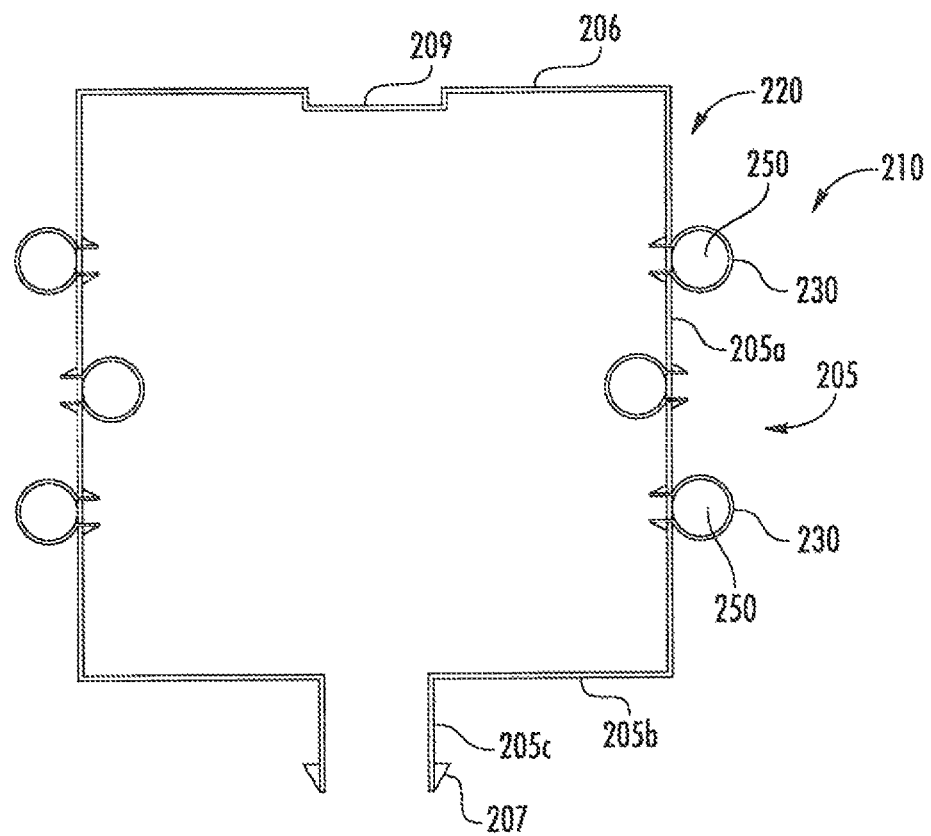
FIG. 8 is a top view of a mounting substrate of a cable hanger assembly according to alternative embodiments of the invention, with clips of FIG. 6A inserted therein to hold cables.
Figure 9:
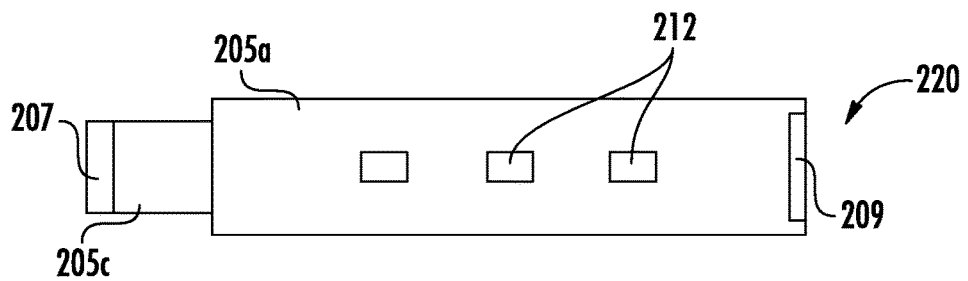
FIG. 9 is a side view of the mounting substrate of FIG. 8.
Figure 10:
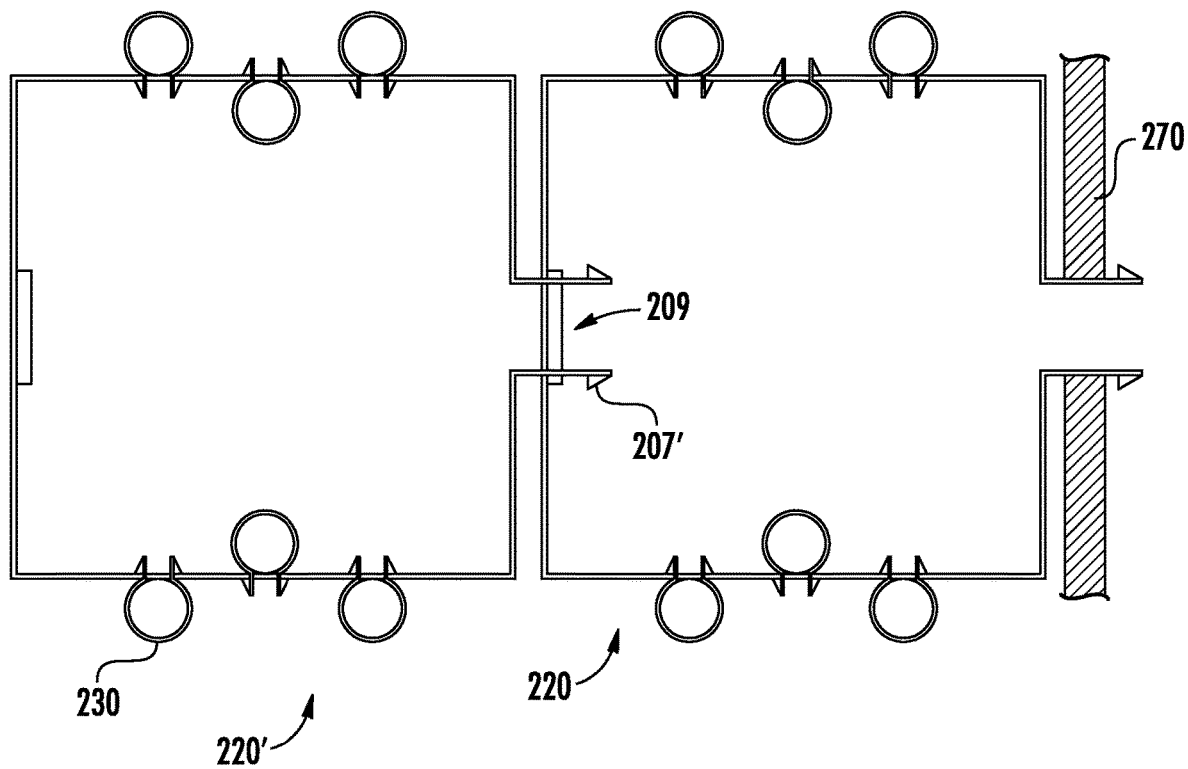
FIG. 10 is a top view of two cable hanger assemblies of FIG. 8 mounted in a stacked fashion.

Referring now to FIGS. 8-10, another cable hanger assembly, designated broadly at 210, is shown therein. The assembly 210 includes a mounting substrate 220 that is somewhat similar to the cable hangers 10, 610 discussed above, with a base 206, arms 205 that extend from ends of the base 206, and locking projections 207 on the arms 205. The arms 205 are tripartite, with serially merging segments 205a, 205b, 205c; as can be seen in FIG. 8, the segments 205a and 205c and generally parallel with each other and perpendicular to the segment 205b, and the locking projections 207 extend from segments 205c. A mounting hole 209 is present in the base 206.

It can be seen in FIG. 9 that each segment 205a of the arms 205 includes three holes 212. As shown in FIG. 8, the holes 212 are configured to receive clips 230 similar to clips 130, 130' discussed above. Each of the clips 230 can capture and secure a cable 250 to the mounting substrate 220. The cables 250 can either be secured within the perimeter of the mounting substrate 220 or outside of the perimeter (both are shown in FIG. 8).

Referring now to FIG. 10, it can be seen that the mounting substrates 220 are "stackable." More specifically, the locking projections 207' of a second mounting substrate 220' can be inserted into the mounting hole 209 of a first mounting substrate 220 that is mounted to a mounting structure 270. Additional mounting substrates 220 can be further stacked. Each of the mounting substrates 220 can be used for the mounting of multiple cables with clips 230.

Those skilled in this art will appreciate that other variations of the mounting substrate 220 may be suitable. For example, any or all of the segments 205a, 205b, 205c of the arms 205 and/or the base 206 may include curved or bent portions as desired. All of the clips 230 may be inserted internally (i.e., within the periphery of the mounting substrate 220) or externally (i.e., outside of the periphery of the mounting substrate 220), or some clips 230 may be inserted internally and others externally. The mounting substrate 220 may lack the mounting hole 220, in which case the mounting substrate 220 may not be stackable; in such an instance, additional holes may be present in the base 206 for the mounting of more clips 230. Other variations may also be possible.

It should also be appreciated that different sizes of clips 130, 130', 230 may be used on the same mounting substrate 120, 220, and/or different sizes of cables may be mounted to a single mounting substrate 120, 220.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A cable hanger assembly, comprising:
 a mounting substrate comprising a main panel, wherein a plurality of holes configured to receive clips are located in the main panel; and
 a plurality of clips, each of the clips configured to receive a cable, each of the clips mounted in one of the plurality of holes of the mounting substrate;
 wherein the mounting substrate further comprises locking features that enable the mounting substrate to be mounted in a hole in a mounting structure, the mounting substrate formed as a monolithic member.

2. The cable hanger assembly defined in claim 1, wherein the plurality of holes are arranged in a grid on the main panel.

3. The cable hanger assembly defined in claim 1, wherein the locking features extend generally perpendicularly away from the main panel in a first direction, and wherein the clips are configured to mount on the main panel and extend away from the main panel in a second direction that is generally opposite to the first direction.

4. The cable hanger assembly defined in claim 1, wherein each of the plurality of clips includes a gripping feature configured to enhance grip on a cable.

5. The cable hanger assembly defined in claim 1, in combination with a plurality of cables mounted to the mounting substrate, each of the cables mounted with a respective one of the plurality of clips.

6. The cable hanger assembly defined in claim 5, wherein at least some of the plurality of cables have a different diameter than at least some others of the plurality of cables.

7. The cable hanger assembly defined in claim 1, wherein the main panel is generally planar.

8. A cable hanger assembly, comprising:
 a mounting substrate comprising a generally planar main panel, wherein a plurality of holes configured to receive clips are located in the main panel; and
 a plurality of clips, each of the clips configured to receive a cable, each of the clips mounted in one of the plurality of holes of the mounting substrate;
 wherein the mounting substrate further comprises locking features that enable the mounting substrate to be mounted in a hole in a mounting structure, the locking features extending generally perpendicularly away from the main panel in a first direction from a location within the plurality of holes, the mounting substrate formed as a monolithic member.

9. The cable hanger assembly defined in claim 8, wherein the plurality of holes are arranged in a grid on the main panel.

10. The cable hanger assembly defined in claim 8, wherein the clips are configured to mount on the main panel and extend away from the main panel in a second direction that is generally opposite to the first direction.

11. The cable hanger assembly defined in claim 8, wherein each of the plurality of clips includes a gripping feature configured to enhance grip on a cable.

12. The cable hanger assembly defined in claim 8, in combination with a plurality of cables mounted to the mounting substrate, each of the cables mounted with a respective one of the plurality of clips.

13. The cable hanger assembly defined in claim 12, wherein at least some of the plurality of cables have a different diameter than at least some others of the plurality of cables.

14. A cable hanger assembly, comprising:
 a mounting substrate comprising a generally planar main panel, wherein a plurality of holes configured to receive clips are located in the main panel and are arranged in a two-dimensional grid; and a plurality of clips, each of the clips configured to receive a cable, each of the clips mounted in one of the plurality of holes of the mounting substrate;

wherein the mounting substrate further comprises locking features that enable the mounting substrate to be mounted in a hole in a mounting structure, the locking features extending generally perpendicularly away from the main panel in a first direction from a location within the plurality of holes, the mounting substrate formed as a monolithic member; and wherein the clips are configured to mount on the main panel and extend away from the main panel in a second direction that is generally opposite to the first direction.

15. The cable hanger assembly defined in claim 14, wherein each of the plurality of clips includes a gripping feature configured to enhance grip on a cable.

16. The cable hanger assembly defined in claim 14, in combination with a plurality of cables mounted to the mounting substrate, each of the cables mounted with a respective one of the plurality of clips.

17. The cable hanger assembly defined in claim 16, wherein at least some of the plurality of cables have a different diameter than at least some others of the plurality of cables.

\* \* \* \* \*